US008954801B2

(12) United States Patent
Tatsuno (10) Patent No.: US 8,954,801 B2
(45) Date of Patent: Feb. 10, 2015

(54) MICROCOMPUTER AND METHOD OF OPERATION THEREOF (75) Inventor: Isao Tatsuno, Tokyo (JP)

(73) Assignee: L E Tech Co., Ltd., Tokyo (JP)

( * ) Notice: Subject to any disclaimer, the term of this patent is extended or adjusted under 35 U.S.C. 154(b) by 199 days.

(21) Appl. No.: 13/501,718

(22) PCT Filed: Oct. 15, 2010

(86) PCT No.: PCT/JP2010/068203
§ 371 (c)(1),
(2), (4) Date: Jun. 18, 2012

(87) PCT Pub. No.: WO2011/046217
PCT Pub. Date: Apr. 21, 2011

(65) Prior Publication Data
US 2012/0254658 A1 Oct. 4, 2012

(30) Foreign Application Priority Data
Oct. 15, 2009 (JP) .................................. 2009-238742

(51) Int. Cl.
G06F 11/00 (2006.01)
G06F 11/07 (2006.01)
G06F 1/24 (2006.01)
(52) U.S. Cl.
CPC .............. *G06F 11/0793* (2013.01); *G06F 1/24* (2013.01)
USPC .................................. 714/24; 714/23; 714/15
(58) Field of Classification Search
CPC ......... G06F 9/4812; G06F 1/24; G06F 13/24; G06F 11/0757

USPC ................................................. 714/24, 23, 15
See application file for complete search history.

(56) References Cited

U.S. PATENT DOCUMENTS

| 4,234,870 | A | * | 11/1980 | Sibley ........................... 714/708 |
| 4,410,939 | A | * | 10/1983 | Kawakami ..................... 710/264 |
| 4,903,193 | A | * | 2/1990 | Nakamura ....................... 714/55 |
| 5,109,506 | A | * | 4/1992 | Begun ............................ 714/23 |
| 5,404,356 | A | * | 4/1995 | Abe ................................ 714/55 |
| 5,594,865 | A | * | 1/1997 | Saitoh ............................ 714/55 |
| 5,751,997 | A | | 5/1998 | Kullick et al. |
| 5,752,073 | A | | 5/1998 | Gray et al. |

(Continued)

FOREIGN PATENT DOCUMENTS

CN 1790282 A 6/2006
CN 1828548 A 9/2006

(Continued)

*Primary Examiner* — Loan L. T. Truong
(74) *Attorney, Agent, or Firm* — McDermott Will & Emery LLP (57) ABSTRACT

Disclosed is a microcomputer such that even when a program cannot be executed in a CPU of the microcomputer due to an external noise, an unstable power-supply voltage, and other causes, and an fatal error such as runaway occurs, returning to the original state is possible within an extremely short time while preferably avoiding initialization of the entire system. During execution of normal software processing, an interrupt signal and a reset signal are output at an arbitrary time, and if it is determined that a CPU of a microcomputer gets into a runaway state, data which has been stored in a RAM as recovery information is read out, and the CPU is recovered to the state before the runaway. Because such recovery from a fatal error occurs within a short time, software which is being executed can continue its processing as if the fatal error had not occurred.

5 Claims, 7 Drawing Sheets

(56) References Cited

U.S. PATENT DOCUMENTS

| | | | |
|---|---|---|---|
| 5,806,621 A * | 9/1998 | Soda et al. ................. 180/206.4 |
| 6,378,068 B1 * | 4/2002 | Foster et al. ....................... 713/1 |
| 6,421,279 B1 * | 7/2002 | Tobita et al. ........... 365/189.011 |
| 6,490,692 B1 * | 12/2002 | Nomura et al. ................. 714/15 |
| 6,498,403 B1 * | 12/2002 | Hagidaira et al. ............. 307/9.1 |
| 6,647,503 B1 * | 11/2003 | Kuroda ........................ 713/322 |
| 6,678,586 B2 * | 1/2004 | Nakamoto et al. ................. 701/1 |
| 6,721,903 B2 * | 4/2004 | Yoshioka et al. .............. 714/10 |
| 6,779,065 B2 | 8/2004 | Murty et al. |
| 7,103,738 B2 | 9/2006 | Yoneda et al. |
| 7,111,150 B2 * | 9/2006 | Iwata .............................. 712/37 |
| 7,174,483 B2 * | 2/2007 | Becher et al. ................. 714/55 |
| 7,457,928 B2 * | 11/2008 | Evanchik et al. ............ 711/162 |
| 7,472,236 B2 | 12/2008 | Hillier, III et al. |
| 7,500,021 B2 * | 3/2009 | Takahashi ......................... 710/5 |
| 7,558,990 B2 * | 7/2009 | Tsuyuno et al. ................ 714/53 |
| 7,610,462 B2 | 10/2009 | Gagner et al. |
| 7,721,083 B2 * | 5/2010 | Ikedo ............................... 713/2 |
| 8,020,039 B2 * | 9/2011 | Reid et al. ....................... 714/10 |
| 8,127,183 B2 * | 2/2012 | Kamiya et al. ................. 714/48 |
| 2004/0037156 A1 * | 2/2004 | Yoneda et al. ................ 365/232 |
| 2005/0038924 A1 * | 2/2005 | Takahashi ......................... 710/5 |
| 2006/0161748 A1 | 7/2006 | Wang et al. |
| 2007/0288741 A1 | 12/2007 | Ikedo |
| 2008/0148015 A1 | 6/2008 | Takamoto et al. |
| 2010/0037096 A1 | 2/2010 | Bum et al. |
| 2013/0055017 A1 | 2/2013 | Tatsuno |

FOREIGN PATENT DOCUMENTS

| | | |
|---|---|---|
| JP | H05-155295 A | 6/1993 |
| JP | 6-071024 A | 3/1994 |
| JP | 06-139087 A | 5/1994 |
| JP | 6-161797 A | 6/1994 |
| JP | 06-250860 A | 9/1994 |
| JP | A-H07-219796 | 8/1995 |
| JP | A-H07-219809 | 8/1995 |
| JP | H09-237076 A | 9/1997 |
| JP | 09-297715 A | 11/1997 |
| JP | 9-319602 A | 12/1997 |
| JP | 10-133958 A | 5/1998 |
| JP | 10-240620 A | 9/1998 |
| JP | 2001-084178 A | 3/2001 |
| JP | 2001-188687 A | 7/2001 |
| JP | 2004-086451 A | 3/2004 |
| JP | 2007-323631 A | 12/2007 |
| JP | 2008-152594 A | 7/2008 |
| JP | 2009-238742 | 10/2009 |
| RU | 2020572 C1 | 9/1994 |
| RU | 2265240 C2 | 11/2005 |
| RU | 2280272 C2 | 7/2006 |
| WO | WO-2011/046217 | 4/2011 |

* cited by examiner

MICROCOMPUTER AND METHOD OF OPERATION THEREOF

TECHNICAL FIELD

The present invention relates to a method of operation of a microcomputer. More particularly, the present invention relates to a circuit for, in the event of an error, such as so-called "runaway", in a central processing unit (CPU), automatically recovering the CPU, and a usage of the circuit.

BACKGROUND ART

Due to external electrical noise, static electricity, instability of power supply voltage and other factors, a fatal error is likely to occur in a CPU of a microcomputer. This can preclude the CPU from executing programs. For example, such a fatal error state includes so-called "CPU runaway". A common one of the countermeasures to a fatal error in the CPU of the microcomputer is a technique known as "watchdog". In this technique, a timer having a cycle (loop) time sufficiently greater than that of software-based processing is provided, and configured to be reset at intervals of the loop of the software-based processing. In the event of a fatal error in the CPU, the software-based processing does not operate normally, so that the timer will expire without being reset, and the expiration of the timer serves as a trigger for providing a reset to the entire microcomputer. On the other hand, when the CPU operates normally (when no fatal error occurs), the microcomputer is not reset, because the timer is reset before the expiration.

However, in this technique, a fatal error state of the CPU is likely to continue for a large part of a time period from the start to expiration of the timer. Thus, in an environment where a lag time between the occurrence of a fatal error in the CPU and the expiration of the timer has an adverse effect on the use of the microcomputer, or where a false operation of the microcomputer during the lag time poses a risk to a user, the watchdog is not necessarily effective. However, it is employed because there is no other means.

Moreover, in the watchdog-based countermeasure to a fatal error in the CPU, it is difficult to, after the occurrence of the fatal error in the CPU, return the CPU to a state just before the occurrence of the error. This is because it takes a long time before a fatal error in the CPU is detected, so that a state of information in a CPU register or the like at a timing of the detection of the fatal error in the CPU becomes different from a state just before the occurrence of the fatal error.

Heretofore, a microcomputer has been configured such that, in response to detecting a fatal error in the CPU, it is entirely initialized while discarding the information in the CPU register or the like at the timing of the detection of the fatal error in the CPU. Thus, in order to recover the CPU from a fatal error, it is conventionally necessary to take a time for initializing the entire microcomputer, in addition to a time for detecting the fatal error in the CPU. Then, in order to return the microcomputer to the state just before the occurrence of the fatal error in the CPU, it is necessary to allow processing (processing according to an application program) which has been previously running until just before the occurrence of the error, to be reproduced after reset or initialization of the CPU. It is not easy to reproduce the previously running processing. Moreover, it is necessary to take a processing time for performing the reproduction. Therefore, depending on a usage environment of the microcomputer, the above technique of recovering the microcomputer from the fatal error of the CPU is likely to cause a big problem. For example, a machine is likely to be placed in an unstoppable state during the period after the fatal error in the CPU through until the initialization, resulting in the occurrence of an accident, and a serious situation such as a loss of monetary count is likely to occur.

Generally, only one signal for initialization is used for a one-chip microcomputer using a microcomputer. This means that the initialization is performed on the entire microcomputer. Thus, the microcomputer is designed on the assumption that the initialization of the microcomputer is performed in the event of an error having severity justifying the initialization of the entire microcomputer. Therefore, it is conventionally believed that it is unavoidable to take a long time for recovering the CPU from a fatal error therein, or to lose information or the like before the occurrence of the fatal error.

There has also been known a technique of periodically or cyclically providing a reset to only a CPU, instead of the cyclic interrupt, as disclosed in the following Patent Document 1. In the case of using this technique, a time period from the start to end of execution of an application program to be executed on the CPU is required to fall within a cycle time of the reset. This is because, if the CPU is reset during execution of the application program, information in a CPU register such as a program counter or a stack is also reset, so that addresses for instructions in the application program are erased. Thus, in the case of cyclically resetting only the CPU, the application program is required to have a significantly small size enough to allow a time period from the start to end of the processing thereof to fall within an interval of the CPU reset cycle. For this reason, a required size of the application program becomes smaller than that of a common program. This leads to an enormous increase in the number of the application programs. There is another problem that a programmer must create the application program in consideration of not only contents of processing based on the application program but also the reset cycle.

LIST OF PRIOR ART DOCUMENTS

Patent Documents

Patent Document 1: JP 06-071024 A
Patent Document 2: JP 09-319602 A

SUMMARY

An aspect of the subject technology is intended to, in the event of a fatal error in a CPU of a microcomputer, reset only the CPU without initializing or resetting the entire microcomputer, to allow the CPU of the microcomputer to be recovered from a fatal error state within a significantly short period of time. An aspect of the subject technology is further intended to reset the CPC without exerting an adverse effect on an application program being executed on the microcomputer.

An aspect of the subject technology provides a microcomputer which comprises: a CPU; a RAM connected to the CPU via a CPU bus; interrupt request signal output circuit operable to output, to the CPU, an interrupt request signal for requesting to start execution of interrupt processing; and CPU reset signal output circuit operable, after the interrupt request signal output circuit outputs the interrupt request signal, to output, to the CPU, a CPU reset signal for requesting to start CPU reset processing, wherein the CPU is operable, upon receiving the interrupt request signal, to stop processing of an application program being executed on the CPU, and store, in the RAM, information from a CPU register of the CPU, as recovery information, and, then upon receiving the CPU reset signal, to undergo a reset, and copy the recovery information stored in the RAM, to the CPU register.

Preferably, in one aspect, the microcomputer further comprises a timer counter circuit for cyclically generating the CPU reset signal and the interrupt request signal.

More preferably, in one aspect of the above microcomputer, the timer counter circuit comprises an additional timer, and the CPU is operable to determine whether the information from the CPU register is normal, wherein the additional timer is configured such that, only when the information from the CPU register is determined to be normal, it is activated to prohibit the execution of the CPU reset processing, during a time period in which the CPU reset signal is supplied to the CPU.

Preferably, in one aspect, the microcomputer further comprises a system rest signal source for resetting the entire microcomputer, and an OR circuit, wherein the CPU reset signal output circuit and the system rest signal source are connected to an input of the OR circuit, and the CPU is connected to an output of the OR circuit.

An aspect of the subject technology further provides a method of operation of a microcomputer. The method comprises the steps of: outputting, from a timer counter circuit to a CPU, an interrupt request signal for requesting to start execution of interrupt processing; causing the CPU to stop processing of an application program being executed on the CPU, upon receiving the interrupt request signal; causing the CPU to store, in a RAM, information from a CPU register of the CPU as recovery information; after the output of the interrupt request signal, outputting, from the timer counter circuit to the CPU, a CPU reset signal for requesting to start CPU reset processing; causing the CPU to undergo a reset, upon receiving the CPU reset signal; and causing the CPU to copy the recovery information stored in the RAM, to the CPU register.

Preferably, in one aspect of the method, the CPU reset signal and the interrupt request signal are cyclically generated by the timer counter circuit.

More preferably, the above method further comprises, in one aspect, the step of causing the CPU to determine whether the information from the CPU register is normal, and, only when the information from the CPU register is determined to be normal, prohibiting execution of the step of causing the CPU to undergo a reset, during a time period in which the CPU reset signal is supplied to the CPU.

In one aspect, the subject technology makes it possible to early detect that a fatal error occurs in a CPU of a microcomputer, and perform recovery from the fatal error, which allows a microcomputer-applied device to significantly reduce an abnormal operation or a malfunction which occasionally leads to a dangerous situation.

Particularly, in a mechanical-system control device for use in the field of automobiles, airplanes, ships, industrial robots, etc., a malfunction of such a device is likely to lead to a big accident (e.g., brake control or steering control for an automobile). A time required for recovery from a fatal error of the CPU of the microcomputer according to some aspects of the subject technology is far less than a time required for detection of a malfunction of the mechanical-system control device and recovery from the malfunction. Thus, in one aspect, it is valuable that processing for detection of a malfunction of the device due to a fatal error of the CPU of the microcomputer, and recovery from the malfunction, is performed with a focus on a microcomputer, instead of the entire device.

Moreover, in the above fields, a factor causing the fatal error, such as electrical noise, occurs more frequently than in other fields. Thus, certain aspects of the subject technology applied to the mechanical-system control device makes it possible to significantly ease conventional countermeasures variously required for electrical noise and other factors, while taking a stronger countermeasure than ever before, so that it becomes possible to achieve both a reduction in cost and an improvement in reliability. In a situation where a fatal error continuously occurs in the CPU of the microcomputer, it is possible to detect the continuous fatal error in the CPU, and, based on a result of the detection, provide information for alarming a malfunction of the device, through an input/output interface.

In one aspect of the subject technology, in the event of a fatal error in a CPU of a microcomputer, only the CPU is reset, instead of resetting the entire microcomputer. This makes it possible to perform recovery from the fatal error, within a significantly short period of time. In one aspect, the subject technology also makes it possible to reset the CPU after stopping an application program being executed on the CPU when a fatal error occurs in the CPU, and then restart the execution of the application program from a state at a timing just before the occurrence of the fatal error.

An example in the field where it is expected to utilize aspects of the subject technology will be taken as follows. Even in a situation where, during operation of a lift or elevator, a fatal error occurs in a CPU of a microcomputer for controlling the elevator, due to lightning or power supply noise or noise caused by design defect, and the elevator malfunctions due to the CPU, in one aspect, the microcomputer of the subject technology may be used as the microcomputer for the elevator to allow the elevator to be restored to a stable operating state within a short period of time.

DESCRIPTION OF EMBODIMENTS

Figure 1:
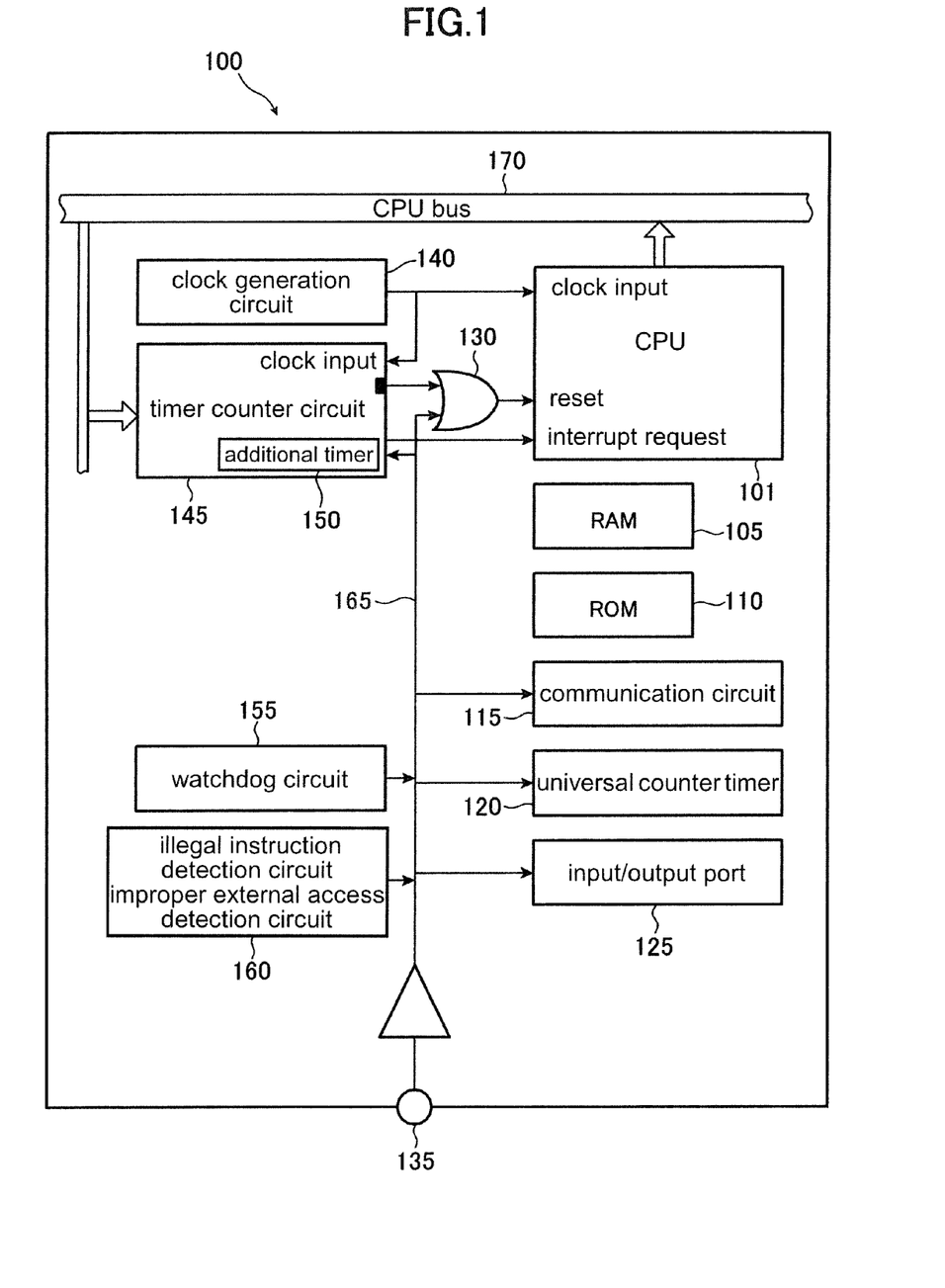
FIG. 1 is a block diagram illustrating an overall configuration of a microcomputer according to one embodiment of the present invention.

FIG. 1 is a block diagram illustrating an overall configuration of a microcomputer according to one embodiment of the present invention. In this embodiment, the microcomputer 100 comprises a central processing unit (CPU) 101, a main memory unit (RAM) 105, a ROM 110, a communication circuit 115, a universal counter timer 120, an input/output port 125, an OR circuit 130, a system reset signal source 135, a clock generation circuit 140, a timer counter circuit 145, additional timer 150, a watchdog circuit 155, an illegal instruction detection circuit and improper external access detection circuit 160, a system resetting bus 165, and a CPU bus 170.

The system reset signal source 135 is operable, in response to a power-on event or the like, to generate a system resetting signal, and send the system resetting signal via the system resetting bus 165. The system resetting signal is a signal for resetting the entire microcomputer. The system resetting signal is used to reset not only the CPU 101 but also other components, such as the input/output port 125, the communication circuit 115 and the universal counter timer 120.

Each of the watchdog circuit 155 and the illegal instruction detection circuit and improper external access detection circuit 160 is operable to determine whether the CPU 101 operates normally. Then, when it is determined that the CPU 101 does not operate normally, the watchdog circuit 155 or the illegal instruction detection circuit and improper external access detection circuit 160 is operable to send a system resetting signal to the CPU 101, the communication circuit 115 and others via the system resetting bus 165 to reset the entire microcomputer 100.

The clock generation circuit 140 is a circuit for generating a system clock signal. The timer counter circuit 145 is a circuit for generating a first processing signal (interrupt request signal) and a second processing signal (CPU reset signal). The OR circuit 130 is a circuit for preventing the CPU reset signal from being sent from the timer counter circuit 145 to the system resetting bus 165 so as to allow the CPU reset signal to be supplied only to the CPU 101. The OR circuit is configured to be supplied with the CPU reset signal and the system resetting signal as an input. Thus, the CPU reset signal is not supplied to any components other than the CPU 101, such as the communication circuit 115 and the universal counter timer 120. The CPU 101 is a circuit for performing controls and operations for the microcomputer 100.

Figure 2:
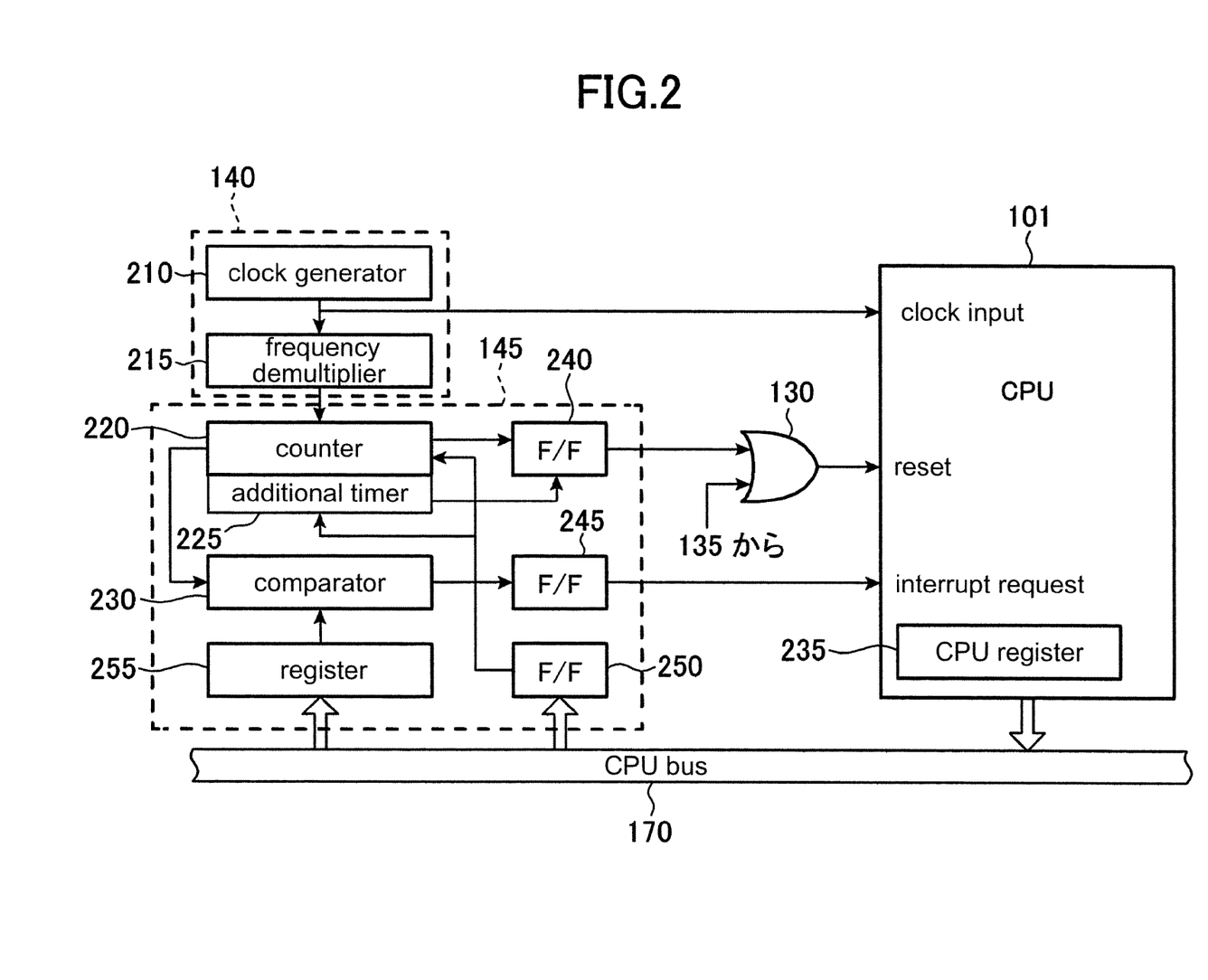
FIG. 2 is a block diagram more specifically illustrating a clock generation circuit, a timer counter circuit and a CPU in FIG. 1.

FIG. 2 is a block diagram more specifically illustrating the clock generation circuit 140, the timer counter circuit 145 and the CPU 101 in FIG. 1. The CPU 101 comprises a CPU register 235. The clock generation circuit 140 comprises a clock generator 210 and a frequency demultiplier 215. The timer counter circuit 145 comprises a counter 220, an additional timer 225, a comparator 230, a register 255, a CPU resetting signal flip-flop circuit 240, an interrupt request signal flip-flop circuit 245, and a system resetting flip-flop circuit 250.

The CPU 101 is connected to each of the register 255 and the system resetting flip-flop circuit 250 via the CPU bus 170. The clock generator 210 is a circuit for generating a system clock signal.

The clock signal generated by the clock generator 210, i.e., a first clock signal, is supplied to the CPU 101 and the frequency demultiplier 215. The frequency demultiplier 215 is operable to convert the first clock signal to a second clock signal having an appropriate frequency. Then, the frequency demultiplier 215 is operable to supply the second clock signal to the counter 220.

The counter 220 is operable to count the second clock signal. The second clock signal is counted until a second clock signal count value reaches an upper limit count value. As used here, the term "second clock signal count value" means a value obtained by subjecting the second clock signal to counting by the counter 220. The counter 220 is operable, when the second clock signal count value reaches the upper limit count value, to generate the CPU reset signal while setting the CPU resetting signal flip-flop circuit 240, and, after several clocks enough to reset the CPU, to reset the CPU resetting signal flip-flop circuit 240. The counter 220 is operable, after the second clock signal count value reaches the upper limit count value, to reset the second clock signal count value, and restart the counting. In another embodiment, the microcomputer may be configured such that the CPU 101 sets the upper limit count value during initialization processing, etc. Even in a situation where the second clock signal count value is changed due to an influence of electrical noise or the like, the counter 220 which is a free-running counter never stops counting the second clock.

In another embodiment, the clock generator 210 may be configured to supply the first clock signal to the counter 220 without using the frequency demultiplier 215. In this case, as a clock signal, the counter 220 uses the first clock signal in place of the second clock signal.

The CPU resetting signal flip-flop circuit 240 is operable to waveform-shape the CPU reset signal received from the counter 220, into a pulse signal having a short pulse width, and supply the pulse signal to the CPU 101. In an another embodiment, in the case where the counter 220 is capable of generating the CPU reset signal in the form of a pulse signal having a short pulse width, the microprocessor may be configured such that the counter 220 supplies the CPU reset signal directly to the CPU 101 without passing through the CPU resetting signal flip-flop circuit 240.

Upon power-on or the like, the system resetting signal is supplied to the CPU 101 via the system resetting bus 165. The CPU 101 is operable, in response to receiving the system resetting signal, to reset the system resetting flip-flop circuit 250. In another embodiment, the microcomputer may be configured such that, upon power-on or the like, the system reset signal source 135 resets the system resetting flip-flop circuit 250 via the system reset bus. In another embodiment, the CPU 101 may be configured to supply the system reset signal to the timer counter circuit 145 to reset an entirety or a part of the components of the timer counter circuit 145.

Subsequently, during initialization processing, the CPU 101 is operable to set the system resetting flip-flop circuit 250. The counter 220 is configured to be prevented from counting the second clock signal when the system resetting flip-flop circuit 250 is under a reset mode. The counter 220 is configured to start counting the second clock signal when the system resetting flip-flop circuit 250 is set through the initialization processing.

During the initialization processing, the CPU 101 is operable to supply a comparative value which is a predetermined numerical value, to the register 255 via the CPU bus 170. The register 255 is operable to store therein the comparative value.

The comparator 230 is operable to compare the second clock signal count value with the comparative value stored in the register 255. The comparator 230 is operable, when the second clock signal count value is coincident with the comparative value, to generate an interrupt request signal and supply the interrupt request signal to the interrupt request signal flip-flop circuit 245.

The interrupt request signal flip-flop circuit 245 is operable to adjust the interrupt request signal received from the comparator 230, to a pulse signal having a short pulse width, and supply the pulse signal to the CPU 101. In another embodiment, in the case where the comparator 230 is capable of generating the interrupt request signal in the form of a pulse signal having a short pulse width, the microcomputer may be configured such that the comparator 230 supplies the interrupt request signal directly to the CPU 101 without passing through the interrupt request signal flip-flop circuit 245.

In another embodiment, the counter 220, the counter 220 may comprise the additional timer 225. The additional timer 225 has a timer function to be put into an active state only for a predetermined time. When the timer function is in the active state, the additional timer 225 is operable to control the counter 220 to prohibit the counter 220 from supplying the CPU reset signal to the CPU resetting signal flip-flop circuit 240. In another embodiment, the additional timer 225 may be configured to, when the timer function is in the active state, reset the CPU resetting signal flip-flop circuit 240 to prohibit the CPU resetting signal flip-flop circuit 240 from supplying the CPU reset signal to the CPU 101.

[First Embodiment]

An operation of the circuit in FIG. 2 will be described below.

Firstly, upon a power-on event, the system reset signal source 135 resets the counter 220 and all of the flip-flop circuits 240, 245, and 250 in the timer counter circuit 145. In another embodiment, the microcomputer may be configured such that the system resetting flip-flop circuit 250 is reset by the CPU 101. After the power-on event, the CPU 101 executes the initialization processing. During the initialization processing, the CPU 101 firstly sets an appropriate comparative value to the register 255.

The comparative value is a value to be used when the comparator 230 generates the interrupt request signal. The comparator 230 compares the second clock signal count value with the comparative value, and, when they are coincident with each other, generates the interrupt request signal. Then, the CPU 101 receives the interrupt request signal and executes the interrupt processing. Thus, the interrupt processing is executed during an elapse of a time period (comparison time) after start of counting of the second clock signal through until the second clock signal count value reaches the comparative value. This means that the interrupt signal is generated at predetermined time intervals. Then, the CPU 101 receives the interrupt signal at the predetermined time intervals and executes the interrupt processing. The comparison time is a time required for counting the second clock signal until the second clock signal count value reaches the comparative value, and obtained by the following formula: (a cycle time of the second clock)×(the comparative value).

As used here, the term "interrupt processing" is processing having a higher processing priority than that of an application program. Then, when the interrupt processing is triggered, the CPU 101 interrupts an application program and starts the interrupt processing.

The system resetting flip-flop circuit 250 is reset by the CPU 101 or the system reset signal source 135, only when the system resetting signal is generated during power-on of the microcomputer 100 or the like. Subsequently, during the initialization processing, the CPU 101 sets the system resetting flip-flop circuit 250. Just after the system resetting flip-flop circuit 250 is set, the counter 220 starts counting the second clock signal. The reason why no software-based resetting means is provided is to prevent the system resetting flip-flop circuit 250 from being reset in the event of a fatal error in the CPU. In the case where it is guaranteed that the system resetting flip-flop circuit 250 operates without being reset in the event of a fatal error in the CPU, software-based means for resetting the system resetting flip-flop circuit 250 may be provided.

The comparator 230 compares the second clock signal count value with the comparative value stored in the register 255. In other words, the comparator 230 ascertains whether the comparison time has elapsed after the start or restart of counting of the second clock signal. When the second clock signal count value and the comparative value are coincident with each other, the comparator 230 generates the interrupt signal while setting the interrupt request signal flip-flop circuit 245, and, after several clocks, resets the interrupt request signal flip-flop circuit 245. The interrupt request signal flip-flop circuit 245 waveform-shapes the interrupt request signal into a pulse signal having a short pulse width. The interrupt request signal shaped into a pulse signal is supplied to the CPU 101.

In another embodiment, in the case where the comparator 230 is capable of generating the interrupt request signal in the form of a pulse signal having a short pulse width, the microcomputer may be configured such that the comparator 230 supplies the interrupt request signal directly to the CPU 101 without passing through the interrupt request signal flip-flop circuit 245. In response to receiving the interrupt request signal, the CPU 101 executes the interrupt processing.

The counter 220 ascertains whether or not the second clock signal count value has reached an upper limit count value. In other words, the counter 220 ascertains whether an upper limit counter time has elapsed after start or restart of counting of the second clock signal. The upper limit counter time is a time required for counting the second clock signal until the second clock signal count value reaches the upper limit count value, and obtained by the following formula: (the cycle time of the second clock)×(the upper limit count value).

When it is ascertained that the second clock signal count value has reached the upper limit count value, the counter 220 generates the CPU reset signal while setting the CPU resetting signal flip-flop circuit 240. The CPU resetting signal flip-flop circuit 240 waveform-shapes the CPU reset signal into a pulse signal having a short pulse width. The CPU reset signal shaped into a pulse signal is supplied to the CPU 101.

In an another embodiment, in the case where the counter 220 is capable of generating the CPU reset signal in the form of a pulse signal having a short pulse width, the microprocessor may be configured such that the counter 220 supplies the CPU reset signal to the CPU 101 without passing through the CPU resetting signal flip-flop circuit 240.

In response to receiving the CPU reset signal, the CPU 101 executes the CPU reset processing. The CPU resetting signal flip-flop circuit 240 is reset, for example, by the counter 220, shortly after being set.

The following description will be made about a time period from the start to end of execution of the interrupt processing to be executed in response to receiving the interrupt request signal (interrupt processing execution time). In this embodiment, the comparison time is less than the upper limit counter time. Further, the interrupt processing is executed when an elapsed time from a count start timing of starting or restarting the counting of the second clock signal by the counter 220 reaches the comparison time. The CPU reset processing is executed when then elapsed time from the start or restart of the counting reaches to the upper limit counter time. The interrupt processing must be completed before execution of the CPU reset processing. The reason will be described later. Therefore, a time obtained by subtracting the comparison time from the upper limit counter time must be greater than an execution time of the interrupt processing. More specifically, assuming that a time required for the interrupt processing is 50 microseconds, a time obtained by (the upper limit counter time)−(the comparison time) must be greater than 50 microseconds. Thus, supposing that the upper limit counter time is 5 milliseconds, the comparison time must be less than 4950 microseconds. Preferably, the execution time of the interrupt processing is set to a value which is in the range of about 2 to 5% of an upper limit time of the counter 220.

[Second Embodiment]

The timer counter circuit 145 may further comprise the additional timer 225. During the interrupt processing, the additional timer 225 is started, for example, by the CPU 101. When the CPU reset signal is generated (the elapsed time from the start or restart of the counting reaches the upper limit counter time), the additional timer 225 is operable to prohibit the CPU reset signal from being generated or output. Specifically, the additional timer 225 is operable to supply, to the CPU resetting signal flip-flop circuit 240, a CPU reset prohibition signal which is a signal for prohibiting the flip-flop circuit 240 from being set. In another embodiment, the additional timer 225 may be configured to control the counter 220 to prohibit the counter 220 from generating the CPU reset signal. The microcomputer 100 according to the second embodiment is configured such that the CPU reset processing is not regularly executed, so that it becomes possible to reduce a load on the CPU 101 and others, as compared to the microcomputer 100 according to the first embodiment.

Figure 3:
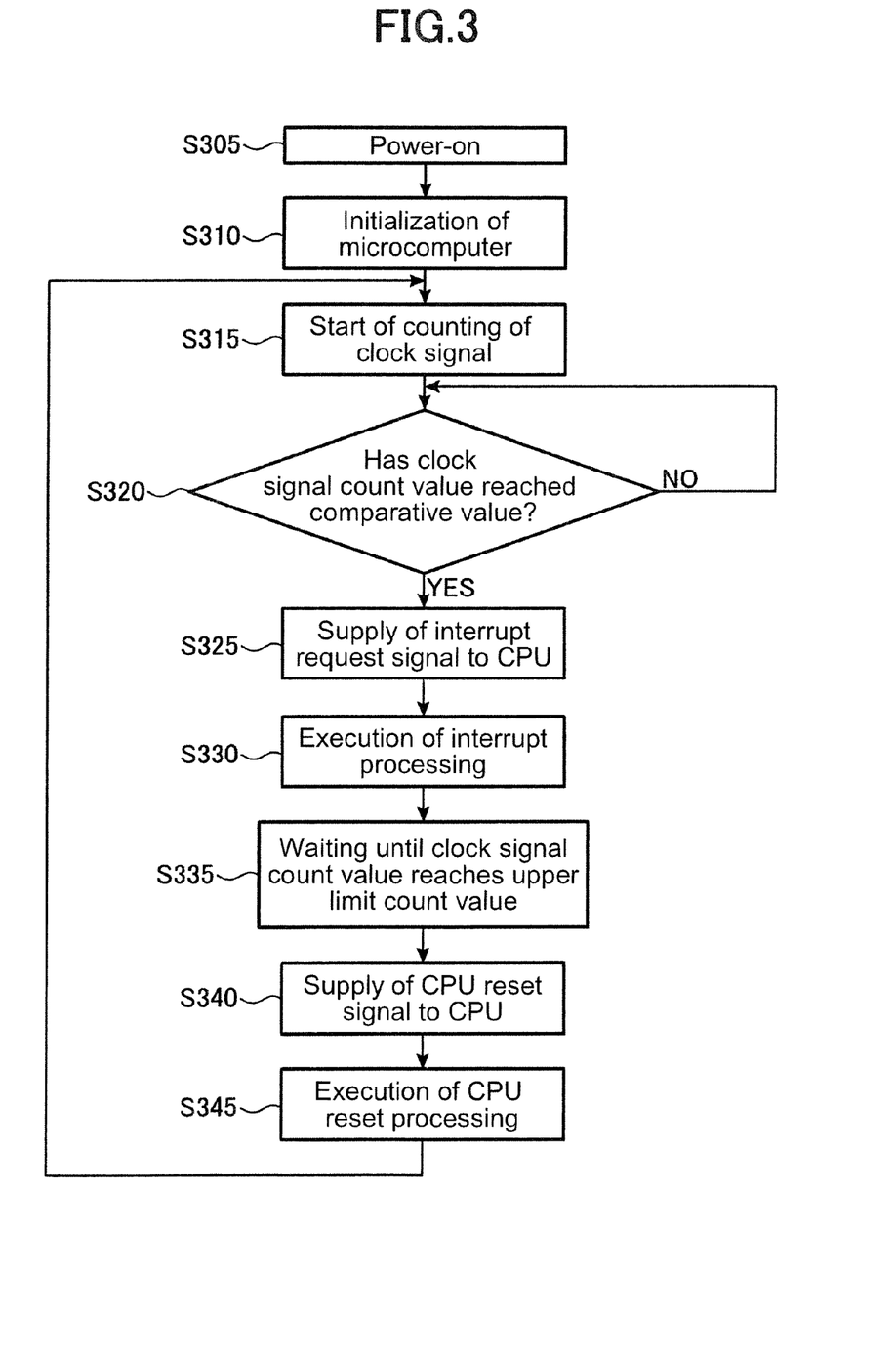
FIG. 3 is a flowchart illustrating an operation of a microcomputer according to a first embodiment of the present invention.

FIG. 3 is a flowchart illustrating an operation of the microcomputer 100 according to the first embodiment. Firstly, the microcomputer 100 is powered on (Step S305). Then, the microcomputer 100 is initialized during the initialization processing (Step S310). After completion of the initialization, the counter 220 counts a clock signal supplied thereto (Step S315).

The comparator 230 determines whether the clock signal count value has reached the comparative value (Step S320). This clock signal count value is a value obtained by subjecting the clock signal to counting by the counter 220. When the clock signal count value has not reached the comparative value, the comparator 230 is kept in a standby state until the clock signal count value becomes equal to the comparative value. When the clock signal count value reaches the comparative value, the comparator 230 generates the interrupt request signal and supplies the interrupt request signal to the CPU 101 (Step S325).

In response to receiving the interrupt request signal, the CPU 101 stops an application program which is being executed, and executes the interrupt processing (Step S330). The interrupt processing will be described in detail later.

After completion of the interrupt processing, the counter 220 is kept in a standby state until the clock signal count value reaches the upper limit count value (Step S335). When the clock signal count value reaches the upper limit count value, the counter 220 generates the CPU reset signal and supplies the CPU reset signal to the CPU 101 (Step S340). Further, the counter 220 resets the clock signal count value and restarts counting the clock signal.

In response to receiving the CPU reset signal, the CPU 101 executes the CPU reset processing (Step S345). The CPU reset processing will be described in detail later.

Figure 4:
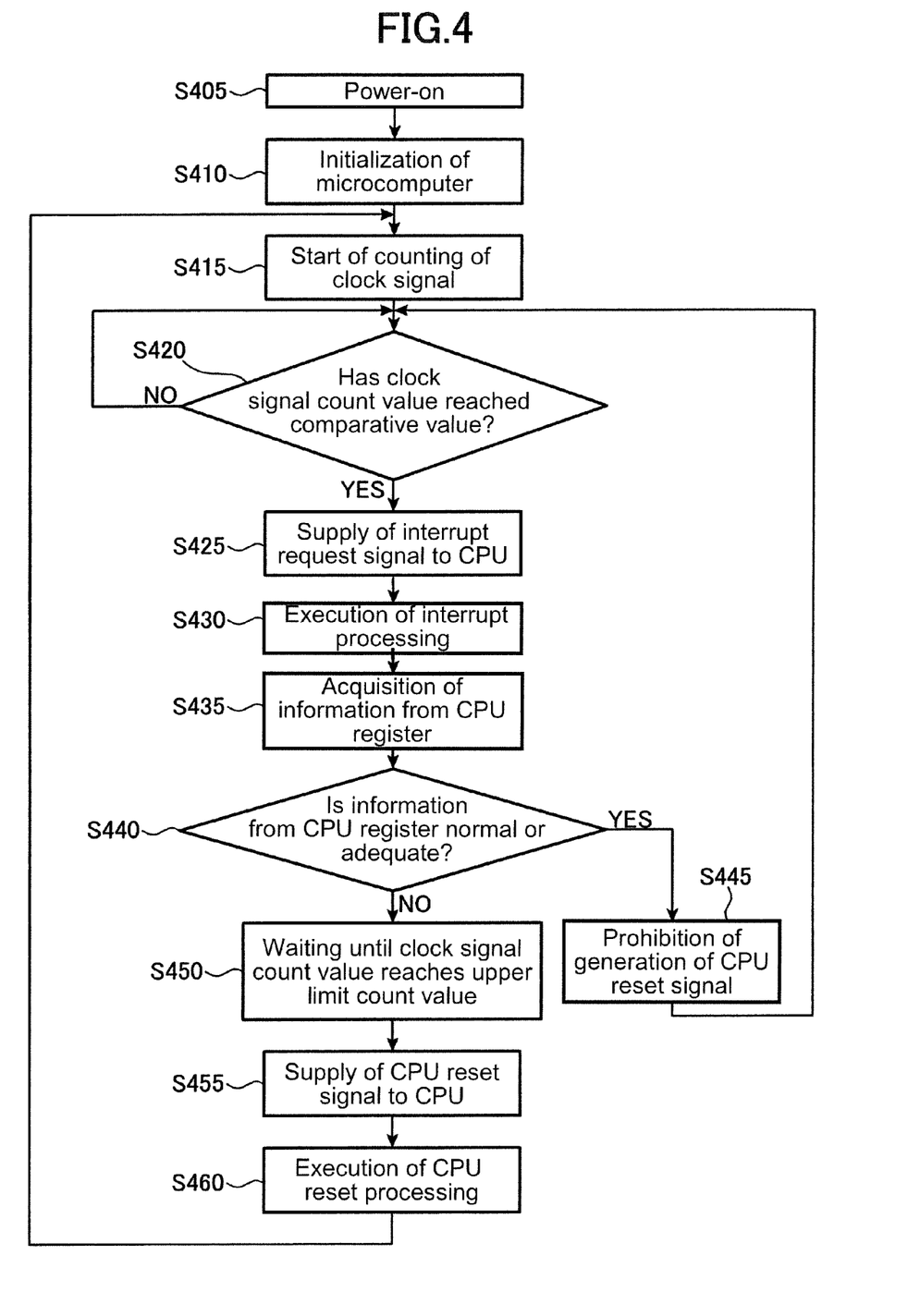
FIG. 4 is a flowchart illustrating an operation of a microcomputer according to a second embodiment of the present invention.

FIG. 4 is a flowchart illustrating an operation of the microcomputer 100 according to the second embodiment. The flowchart in FIG. 1 is partially identical to the flowchart in FIG. 3. Specifically, Steps S405, S410, S415, S420, S425, S430, S450, S455 and S460 in FIG. 4 correspond to respective ones of the Steps S305, S310, S315, S320, S325, S330, S335, S340 and S345 in FIG. 3.

In other words, the flowchart in FIG. 4 is equivalent to a flowchart formed by adding Steps S445, S450 and S455 to the flowchart in FIG. 3. Therefore, a difference between FIGS. 3 and 4 will be primarily described below. The CPU 101 acquires information from the CPU register 235 (Step S435). The CPU 101 determines whether or not the acquired information is normal (Step S440). Whether or not the information from the CPU register 235 is normal may be determined based on whether the value in the CPU register 235 falls within a normal range or is adequate.

When the acquired information is determined to be not normal, Steps S450, S455 and S460 corresponding to respective ones of the Steps S335, S340 and S345 in the flowchart of FIG. 3 will be executed. When the acquired information is determined to be normal, the additional timer 225 prohibits output of the CPU reset signal (Step S445). Alternatively, the CPU 101 may be configured to activate the additional timer 225. In this case, in the event of a fatal error in the CPU 101, the additional timer 225 is not activated, so that the additional timer 225 becomes unable to prohibit output of the CPU reset signal. Thus, the CPU reset signal is supplied to the CPU, and the CPU reset processing is executed. As an example of the case where the additional timer 225 is not activated, a situation can be assumed in which, due to the occurrence of a fatal error in the CPU 101, the CPU 101 fails to accept interrupt processing for activating the additional timer 225.

Figure 5:
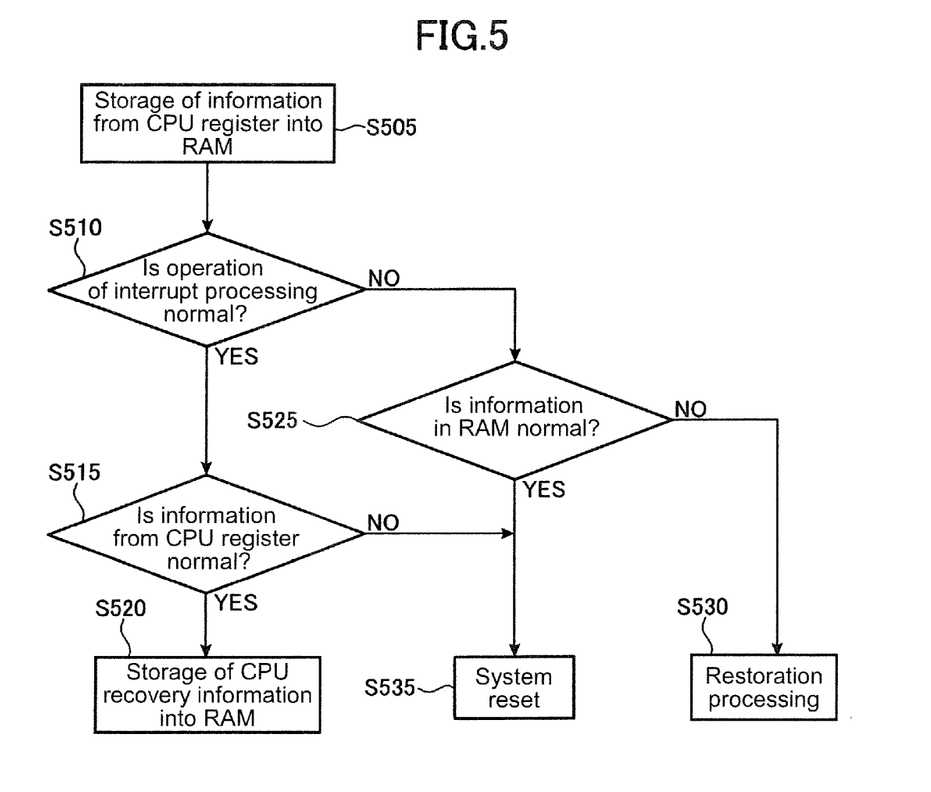
FIG. 5 is a flowchart illustrating an operation of interrupt processing.

FIG. 5 is a flowchart illustrating an operation of the interrupt processing. The execution of the interrupt processing is triggered when the CPU 101 receives the interrupt request signal (see the Steps S325 and S330 in FIG. 3 or the Steps S425 and S430 in FIG. 4). Firstly, the CPU 101 stores, in the RAM 105, information acquired from the CPU register 235 at a timing of the start of the interrupt processing (at a timing of stopping the application program) (Step S505). Then, the CPU 101 determines whether or not the operation of the interrupt processing is normal (Step S510).

Whether or not the operation is normal is determined by causing the CPU 101 to ascertain that specific information stored in the RAM 105 is correct. For example, the CPU 101 may be operable, during the initialization processing, to pre-store at least one predetermined value in the RAM 105, and then during the interrupt processing, to ascertain that the value is not changed. In this case, as long as the CPU 101 operates normally, the predetermined value is not changed, except through the initialization processing. On the other hand, in the event of a fatal error in the CPU 101, for example, due to a false operation of the CPU 101, the predetermined value is likely to be changed. Thus, a change in the predetermined value means the occurrence of the fatal error.

More specifically, the CPU 101 may be operable, during previous interrupt processing, to acquire information from the CPU register 235 at a timing of the start of previous interrupt processing, and store the information acquired from the RAM 105, as recovery information, and, then during current interrupt processing, to compare information acquired from the CPU register 235 at a timing of the start of the current interrupt processing and stored in the RAM 105, with the recovery information acquired at the timing of the start of the previous interrupt processing and stored in the RAM 105, to determine whether or not predetermined data is normal.

The CPU 101 may be operable to ascertain whether or not a predetermined flag is in an ON state, to determine whether or not the predetermined data is normal. As an example of the predetermined flag, an interrupt processing end flag may be provided in the RAM 105. The CPU 101 is operable, when the interrupt processing end flag is in an ON state, to determine that information stored in the RAM 105 is correct. In the case of using the interrupt processing end flag, the CPU 101 is operable, just after the Step S510, to set the interrupt processing end flag to an OFF state, and, at the end of the interrupt processing, to return the interrupt processing end flag to the ON state. Thus, in a situation where a fatal error occurs during execution of the previous interrupt processing, the CPU 101 is operable to determine that specific information stored in the RAM 105 is not correct, because the interrupt processing end flag is in the OFF state in the Step 510 during the current interrupt processing.

The CPU 101 may be operable, during the previous interrupt processing, to store the information acquired from the CPU register 235 and/or the predetermined flag, in two or more areas of the RAM 105, instead of one area of the RAM 105, and, then during the current interrupt processing, to ascertain whether the two or more information and/or the two or more predetermined flags stored in the RAM 105 during the previous interrupt processing are not changed. The CPU 101 is operable, when two or more information and/or the two or more predetermined flags are not changed, to determine that the predetermined data is normal. This makes it possible to more accurately make the determination as to whether or not the predetermined data is normal. As an example, the member of information or flags to be stored may be set to three. In this case, even if one of the three information or flags is changed differently, the CPU 101 can use the remaining two information or flags as correct ones. Thus, even in a situation where data in the RAM 105 is partially corrupted, the CPU 101 can make the determination as to whether or not the predetermined data is normal. The above examples of the determination are offered by way of illustration, and any other suitable technique may also be employed to make the determination.

When the operation of the interrupt processing is normal, the CPU 101 determines whether or not the information acquired from the CPU register 235 at the timing of the start of the interrupt processing and stored in the RAM 105 is normal (Step S515). Whether or not the information acquired from the CPU register 235 at the timing of the start of the interrupt processing is normal may be determined based, for example, on whether a value of the information from the CPU register 235 falls within a normal range or is adequate.

When the information acquired from the CPU register 235 at the timing of the start of the interrupt processing is determined to be normal, the CPU 101 stores the information from the CPU register 235 in another area of the RAM 105 as recovery information (Step S520). In another embodiment, the CPU 101 may be operable to copy the recovery information already stored in the RAM 105 during previous interrupt processing, to another location of the RAM 105 so as to manage a history record of recovery information. In yet another embodiment, in the case of using the interrupt processing end flag, the CPU 101 may be operable to set the interrupt processing end flag to the ON state.

In the Step S510, when the operation of the interrupt processing is determined to be not normal, the CPU 101 determines whether or not the information stored in the RAM 105 is normal (Step S525). The determination in the Step S525 is made using the aforementioned specific information stored in the RAM 105, etc.

In the Step S525, when the information stored in the RAM 105 is determined to be not normal, system reset is performed to reset the entire microcomputer 100 (Step S530). After completion of the system reset, any processing after the Step S530 is cancelled, and the microcomputer 100 is initialized. In still another embodiment, the Step S530 may be configured to allow any component insusceptible to a fatal error in the CPU, such as the input/output port 125, to be free of reset.

In the Step S515, when the information stored in the RAM 105 and the register 235 is determined to be not normal, or, in the Step S525, when the information acquired from the CPU register 235 at the time of the start of the interrupt processing is determined to be normal, the CPU 101 executes processing for restoring information in the CPU register 235, using the recovery information stored in the RAM 105 in the form of a history record, etc (Step S535). In another embodiment, the interrupt processing may be configured such that the Step S535 is followed by the Step S510. As an example of the restoration processing, the CPU 101 may be operable to restore the CPU register 235, using the recovery information stored in the RAM 105 in the form of a history record.

In another embodiment, the interrupt processing may consist only of the Steps S505 and S520.

Figure 6:
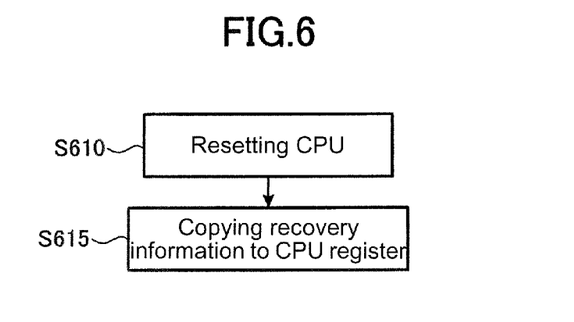
FIG. 6 is a flowchart illustrating an operation of CPU reset processing.

FIG. 6 is a flowchart illustrating an operation of the CPU reset processing. The execution of the CPU reset processing is triggered when the CPU 101 receives the CPU reset signal (see the Steps S340 and S345 in FIG. 3 or the Steps S455 and S460 in FIG. 4).

Firstly, resetting of the CPU 101 is performed (Step S610). Through the resetting, information in the CPU register 235 is cleared. The CPU reset signal serving as a trigger for execution of the CPU reset processing (Step S345 or Step S460) is certainly provided from the timer counter circuit in a cyclic manner. Thus, the CPU reset processing (Step S345 or S460) is executed even if the interrupt processing (Step S330 or S430) is not executed immediately therebefore. In other words, even in a situation where the interrupt processing is not executed due to the occurrence of a fatal error in the CPU 101, the CPU reset processing is executed without relying on the interrupt processing.

The CPU 101 copies the recovery information stored in the RAM 105 to the CPU register 235 (Step S615). The information copied to the CPU register 235 corresponds to the information stored through the interrupt processing (Step S520 in FIG. 5). Thus, the application program which was being executed just before the execution of the interrupt processing can be restarted without being adversely affected by the resetting of the CPU 101.

In another embodiment, the CPU 101 may be configured to, before copying the recovery information to the CPU register 235, check whether a value of the recovery information is normal or adequate. In this case, if the value of the recovery information is not normal or not adequate, system reset may be performed.

When the CPU 101 is reset after the occurrence of a fatal error in the CPU 101, information in the CPU register 235 is overwritten by the recovery information stored in the RAM 105 through the processing in the Step S615. Thus, as long as the recovery information is not affected by a fatal error in the CPU 101, the present invention makes it possible to, even if a fatal error occurs in the CPU 101, recover the CPU 101 from the fatal error.

In this connection, the interrupt processing must be completed before execution of the CPU reset processing as mentioned above, because, when no fatal error occurs in the CPU 101, the recovery information is required to be preliminarily stored in the RAM 105 (see the Step S 520 in FIG. 5) to allow the recovery information to be copied from the RAM 105 to the CPU register 235 in the Step S615 of the CPU reset processing, and the interrupt processing is required to be completed to allow the CPU 101 to stand by for execution of the CPU reset processing.

In another embodiment, a CPU reset processing execution enabling flag may be stored in the CPU register 235 and the RAM 105. In this case, for example, when the recovery information is stored in the RAM 105 during the interrupt processing, the CPU 101 is operable to set the CPU reset processing execution enabling flag to an ON state. Then, only when the CPU reset processing execution enabling flag is in the ON state, the CPU reset processing is executed. After completion of the CPU reset processing, the CPU 101 is operable to set the CPU reset processing execution enabling flag to an OFF state. Thus, in a situation where, due to the occurrence of a fatal error in the CPU, no recovery information is updated in the RAM 105 during the interrupt processing, it becomes possible to prevent recovery information stored before the fatal error from being continuously used. In the situation where no recovery information is updated in the RAM 105 during the interrupt processing, the fatal error in the CPU 101 can be avoided by other means, for example, by resetting the entire microcomputer 100.

In another embodiment, after resetting the CPU (after the Step S610), the CPU reset processing may additionally include the step of, if the recovery information stored in the RAM 105 is not normal, restoring the recovery information. In this case, the CPU 101 can determine whether or not the recovery information is normal, based, for example, on whether a value of the recovery information falls within a normal range or is adequate. As an example of the processing for restoring the recovery information, the CPU 101 may be operable to select normal recovery information from the recovery information history record stored in the RAM 105, and copy the selected recovery information to the CPU register 235.

In yet another embodiment, after resetting the CPU (after the Step S610), the interrupt processing may additionally include the step of, if the microcomputer cannot operate normally, performing system reset. In this case, whether or not the microcomputer can operate normally may be determined by causing the CPU 101 to ascertain that specific information stored in the RAM 105 is correct. Further, whether or not the specific information is correct may be ascertained by determining whether or not specific information to be changed only by the initialization processing is changed by processing other than the initialization processing, due to the occurrence of a fatal error. Alternatively, whether or not the microcomputer can operate normally may be determined by causing the CPU 101 to ascertain whether or not there is recovery information having a value falling within a normal range or an adequate value, in a plurality of recovery information stored in the RAM 105 as a history record. When there is not any recovery information having a value falling within a normal range or an adequate value, it is determined that the microcomputer cannot operate normally.

Figure 7:
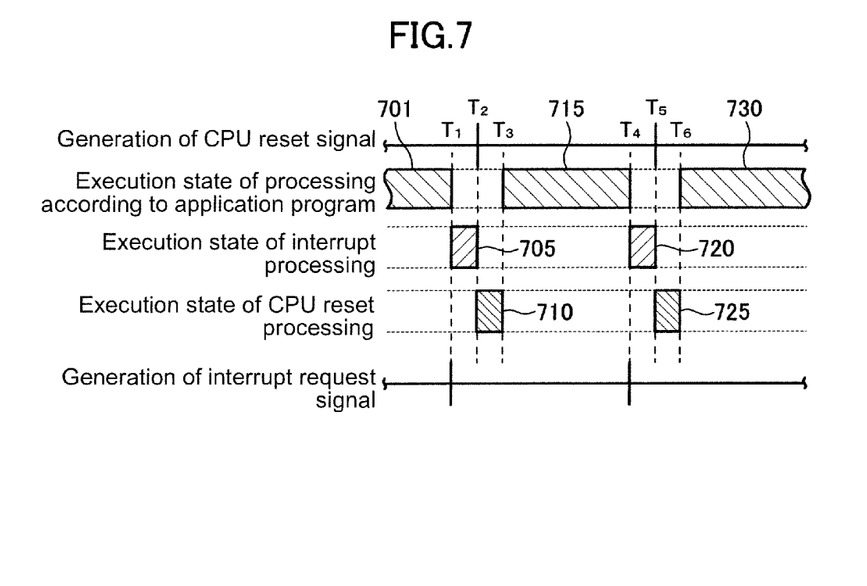
FIG. 7 is a time chart regarding the first embodiment in a situation where a CPU operates normally.

FIG. 7 is a time chart regarding the first embodiment (see FIG. 3) in a situation where the CPU 101 operates normally. In the time chart, time advances in order of T1, T2, --, T5 and T6. Each of the states 701, 715, 730 indicates that processing of an application program is executed. Each of the states 505, 720 indicates that the interrupt processing is executed. Each of the states 710, 725 indicates that the CPU reset processing is executed.

Before the time $T_1$, the processing of the application program is executed (state 701). At the time $T_1$, the CPU 101 receives the interrupt request signal. In response to the receipt of the interrupt request signal as a trigger, the CPU 101 stops the processing of the application program and starts the interrupt processing (state 705). During the interrupt processing, the CPU 101 stores, in the RAM 105, information acquired from the CPU register 235 at a timing of the start of the interrupt processing, as recovery information.

At the time $T_2$, the interrupt processing is completed, and the CPU 101 receives the CPU reset signal. In response to the receipt of the CPU reset signal as a trigger, the CPU 101 starts the CPU reset processing (state 710). During the CPU reset processing, the CPU 101 is reset. Then, the CPU 101 copies the recovery information stored in the RAM 105 to the CPU register 235. Then, at the time $T_3$, the CPU 101 restarts the stopped application program from a state of processing at the time $T_1$. As with the states at the times $T_1$, $T_2$, $T_3$, the stop of the application program, the interrupt processing and the CPU reset processing are executed along with the times $T_4$, $T_5$, $T_6$.

Figure 8:
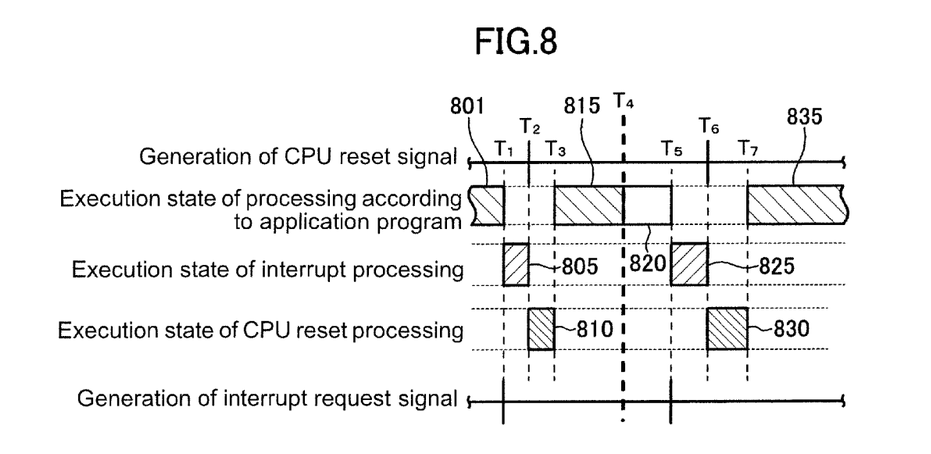
FIG. 8 is a time chart regarding the first embodiment in a situation where a fatal error occurs in the CPU.

FIG. 8 is a time chart regarding the first embodiment (see FIG. 3) in a situation where a fatal error occurs in the CPU 101. Along with the times $T_1$, $T_2$, $T_3$, the processing of the application program, the interrupt processing and the CPU reset processing are executed (states 801, 805, 810). During the interrupt processing in the state 805, the CPU 101 stores, in the RAM 105, recovery information which is information acquired from the CPU register 235 at the time $T_1$.

Assuming that a fatal error occurs in the CPU 101 at the time $T_4$ during execution of the processing of the application program (state 815). Due to the fatal error, the CPU 101 cannot execute the processing normally. The state 820 indicates that the processing of the application program is not executed. The state 825 indicates that the interrupt processing is not executed.

At the time $T_6$, the CPU 101 receives the CPU reset signal. In response to the receipt of the CPU reset signal as a trigger, the CPU 101 starts the CPU reset processing (state 830). During the CPU reset processing, the CPU 101 is reset. Then, the CPU 101 copies the recovery information stored in the RAM 105 to the CPU register 235. Then, at the time $T_7$, the CPU 101 restarts the stopped application program from a state of processing at the time $T_1$ (state 835).

Figure 9:
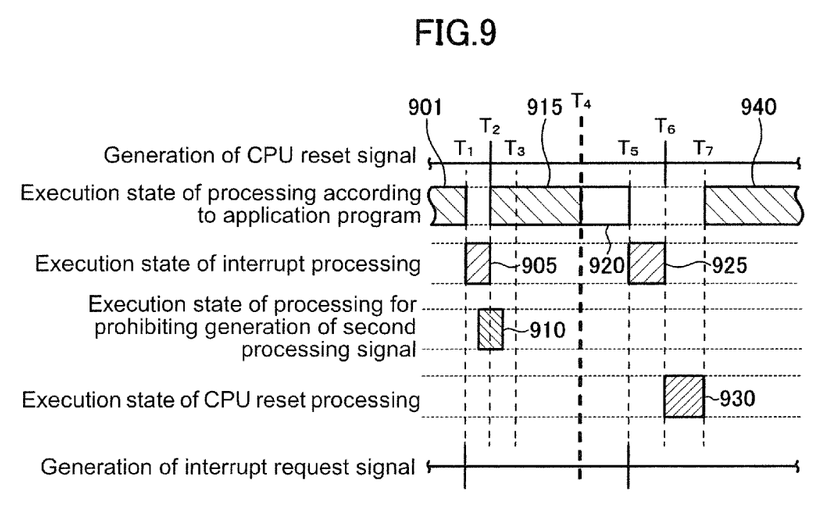
FIG. 9 is a time chart regarding the second embodiment in a situation where a fatal error occurs in a CPU.

FIG. 9 is a time chart regarding the second embodiment (see FIG. 4) in a situation where a fatal error occurs in the CPU 101. Along with the times $T_1$, $T_2$, the processing of the application program and the interrupt processing are executed (states 901, 905). During the interrupt processing in the state 905, the CPU 101 stores, in the RAM 105, recovery information which is information acquired from the CPU register 235 at the time $T_1$.

At the time $T_2$, processing for prohibiting output of the CPU reset signal is executed (state 910). Thus, the CPU reset processing is not executed. After completion of the interrupt processing, the processing of the application program is restarted at the time $T_2$ (state 915), because of non-execution of the CPU reset processing.

Assuming that a fatal error occurs in the CPU 101 at the time $T_4$ during execution of the processing of the application program (state 915). Due to the fatal error, the CPU 101 cannot execute the processing normally, so that the processing of the application program in the state 920 and the interrupt processing in the state 925 will not be executed, and the processing for prohibiting output of the CPU reset signal which was executable at the time $T_2$ will not be executed.

At the time $T_6$, the processing for prohibiting output of the CPU reset signal is not executed. Thus, the CPU 101 receives the CPU reset signal. In response to the receipt of the CPU reset signal as a trigger, the CPU 101 starts the CPU reset processing (state 930). During the CPU reset processing, the CPU 101 is reset. Then, the CPU 101 copies the recovery information stored in the RAM 105 to the CPU register 235. Then, at the time $T_7$, the CPU 101 restarts the stopped application program from a state of processing at the time $T_1$ (state 940).

The present invention is capable of, in the event of an error, such as so-called "runaway", in a CPU, recovering the CPU from the fatal error by resetting only the CPU, instead of resetting the entire microcomputer. This makes it possible to cope with a fatal error occurring in a CPU of an embedded-type microcomputer widely used in industry, at higher speeds and in a simpler manner. In the fields of mechatronics, robots, game devices including a pachinko machine and a slot machine, automobile engine control, brake control, elevator or lift control, etc., a fatal error in a CPU of a microcomputer is likely to cause accident, danger or monetary loss. Thus, in such fields, the microcomputer of the present invention can be used to significantly reduce the risk of the accident or loss.

EXPLANATION OF CODES

100: microcomputer
101: central processing unit (CPU)
105: main memory unit (RAM)
110: ROM
115: communication circuit
120: universal counter timer
125: input/output port
130: OR circuit
135: system reset signal source
140: clock generation circuit
145: timer counter circuit
150: additional timer
155: watchdog circuit
160: illegal instruction detection circuit and improper external access detection circuit
165: system resetting bus
170: CPU bus
210: clock generator
215: frequency demultiplier
220: counter
225: additional timer
230: comparator
235: CPU register
240: CPU resetting signal flip-flop circuit
245: interrupt request signal flip-flop circuit
250: system resetting flip-flop circuit
255: register

What is claimed is:

1. A microcomputer comprising:
   a CPU;
   a RAM connected to the CPU via a CPU bus;
   interrupt request signal output circuit operable to output, to the CPU, an interrupt request signal for requesting to start execution of interrupt processing;
   CPU reset signal output circuit operable, after the interrupt request signal output circuit outputs the interrupt request signal, to output, to the CPU, a CPU reset signal for requesting to start CPU reset processing; and
   a timer counter circuit operable to cyclically generate the CPU reset signal and the interrupt request signal,
   wherein the CPU is operable, upon receiving the interrupt request signal, to stop processing of an application program being executed on the CPU, and store, in the RAM, information from a CPU register of the CPU, as recovery information, and, then upon receiving the CPU reset signal, to undergo a reset, and copy the recovery information stored in the RAM, to the CPU register.

2. The microcomputer as defined in claim 1, wherein the timer counter circuit comprises an additional timer, and the CPU is operable to determine whether the information from the CPU register is normal, and wherein the additional timer is configured such that, only when the information from the CPU register is determined to be normal, it is activated to prohibit the execution of the CPU reset processing, during a time period in which the CPU reset signal is supplied to the CPU.

3. The microcomputer as defined in claim 1, which further comprises a system rest signal source for resetting the entire microcomputer, and an OR circuit, wherein the CPU reset signal output circuit and the system rest signal source are connected to an input of the OR circuit, and the CPU is connected to an output of the OR circuit.

4. A method of operation of a microcomputer, comprising the steps of:
   outputting, from a timer counter circuit to a CPU, an interrupt request signal for requesting to start execution of interrupt processing;
   causing the CPU to stop processing of an application program being executed on the CPU, upon receiving the interrupt request signal;
   causing the CPU to store, in a RAM, information from a CPU register of the CPU as recovery information;
   after the output of the interrupt request signal, outputting, from the timer counter circuit to the CPU, a CPU reset signal for requesting to start CPU reset processing;
   causing the CPU to undergo a reset, upon receiving the CPU reset signal; and
   causing the CPU to copy the recovery information stored in the RAM, to the CPU register,
   wherein the CPU reset signal and the interrupt request signal are cyclically generated by the timer counter circuit.

5. The method as defined in claim 4, which further comprises the step of causing the CPU to determine whether the information from the CPU register is normal, and, only when the information from the CPU register is determined to be normal, prohibiting execution of the step of causing the CPU to undergo a reset, during a time period in which the CPU reset signal is supplied to the CPU.

* * * * *